Sept. 17, 1968  S. LEWIS  3,401,543

STEERING WHEEL LOCKING ATTACHMENT

Filed June 26, 1967

*INVENTOR.*
SAMUEL LEWIS
BY *Kelman and Berman*

AGENTS

3,401,543
STEERING WHEEL LOCKING ATTACHMENT
Samuel Lewis, 670 Riverside Drive,
New York, N.Y. 10031
Filed June 26, 1967, Ser. No. 648,866
7 Claims. (Cl. 70—183)

ABSTRACT OF THE DISCLOSURE

A locking arrangement for the steering wheel of a motorcar includes a flexible, elongated metal belt formed with two passages therethrough of which one is laterally open. Two spacedly juxtaposed straps extend transversely from the belt. A locking mechanism permits the two ends of the belt to be locked to each other while the belt extends about the top of a steering column, and to lock the free ends of the two straps to the belt on either side of a spoke of the steering wheel.

Background of the invention

This invention relates to the prevention of car thefts, and particularly to a locking attachment for the steering wheel of an automotive vehicle.

Motor cars are stolen by the thousands each year. Door locks and ignition locks do not even provide adequate protection against youngsters whose burglar's tools consist of a few pieces of wire. Steering column locks have been found much more effective in protecting cars against unsophisticated potential thieves and are standard equipment on some recently manufactured European cars. It is not practical to install them on cars after the completion of manufacturing operations. When locked, they prevent the steering column from being turned, and it is impossible to drive a car with locked steering gear under its own power.

The object of the present invention is the provision of protection similar to that available from a steering column lock to cars now in use.

Summary of the invention

The invention, in one of its basic aspects, provides an attachment which permits the steering wheel of a motorcar to be locked against rotary movement adequate to permit the car to be driven. The attachment includes an elongated flexible belt which is formed with at least one passage of a size sufficient for receiving a column-mounted gear shifting lever or directional light switch lever. One end of a strap which is elongated transversely of the belt is fixedly attached to the latter. The two longitudinal ends of the belt are locked to each other in the operative position of the belt, and the free end of the strap is also locked to the belt.

Other features and many of the attendant advantages of this invention will be readily appreciated as the same becomes better understood by reference to the following detailed description of a preferred embodiment when considered in connection with the accompanying drawing.

Description of the preferred embodiment

Figure 1:
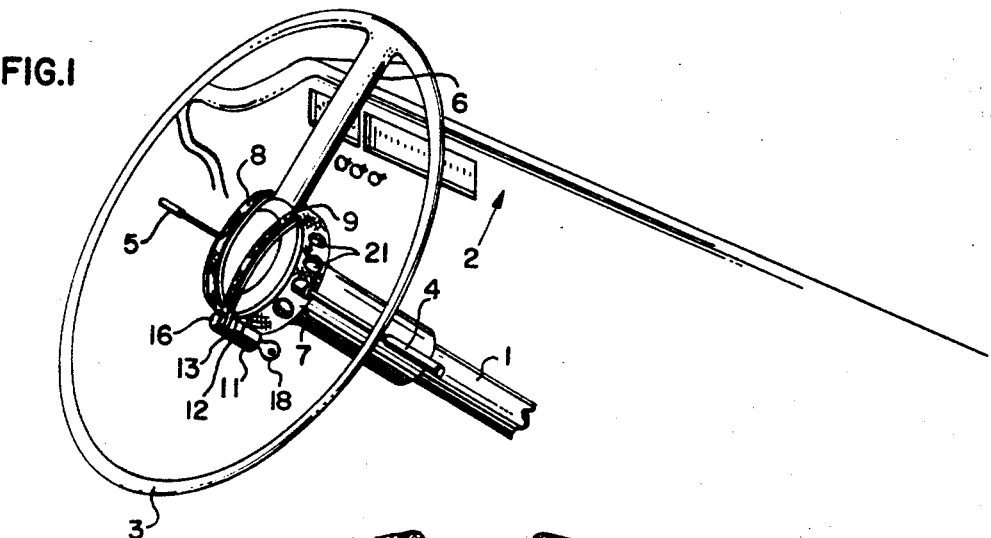
FIG. 1 shows the interior of a motorcar equipped with the locking attachment of the invention in a fragmentary perspective view.

Referring now to the drawing in detail, and initially to FIG. 1, there is shown as much of the interior of an otherwise conventional motorcar as is necessary for an understanding of this invention. The steering column 1 of the car is arranged in its usual spatial relationship to the dashboard 2 and its axial top end carries a steering wheel 3, a gear shifting lever 4, and the operating arm 5 of a directional light switch, not otherwise seen in the drawing. The lever 4 and the arm 5 project from the column 1 in diametrically opposite directions. Only one spoke 6 radially connecting the rim of the wheel 3 to the column 1 has been shown for the sake of clarity. The structure so far described is entirely conventional.

Figure 2:
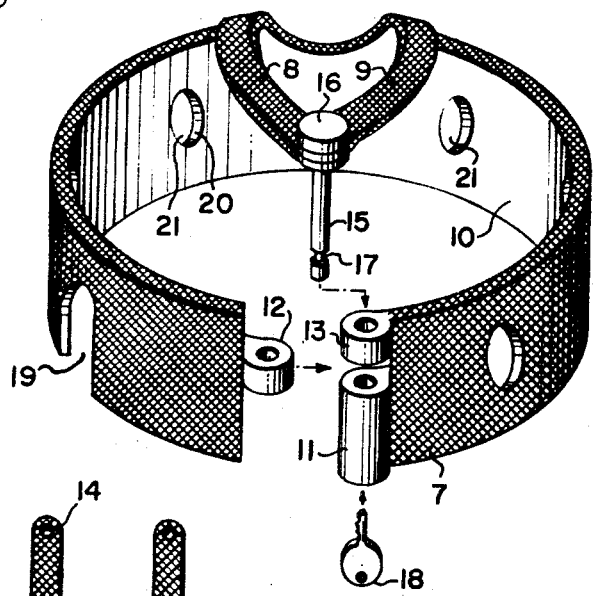
FIG. 2 illustrates the locking attachment of FIG. 1 in the assembled, open condition in a perspective view on a scale greater than that of FIG. 1.
Figure 3:
FIG. 3 shows the locking pin of the attachment of FIG. 2.
Figure 4:
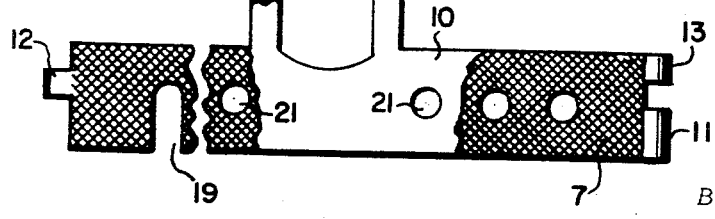
FIG. 4 is a plan view of the belt member of the locking attachment in the flattened condition; a portion of a protective covering being removed to reveal internal structure.

The invention is more specifically concerned with a locking attachment for the wheel 3 whose elements are better seen in FIGS. 2 to 4. The attachment mainly consists of an elongated belt 7 of heavy, but flexible wire netting or chain mail from which two spacedly juxtaposed, integral straps 8, 9 of the same material project transversely. The spacing of the straps 8, 9 is but a small fraction of the belt length. One face of the belt 7 and of the straps 8, 9 is covered with a fabric cushion 10 which has been partly removed in the view of FIG. 4.

The two ends of the belt 7 carry the barrels 11, 12, 13 of a hinge arrangement, the barrel 12 on one end of the belt ends being dimensioned for coaxial insertion into the gap between the two barrels 11, 13 on the other end of the belt. Openings 14 in the free ends of the straps 8, 9 are dimensioned to pass the stem of a hinge pin or locking pin 15, but to retain the head 16 of the pin. The pin fits the bores of the barrels 11, 12, 13. The barrel 11 accommodates a lock, not shown in detail, whose latch engages a circumferential groove 17 in the stem of the pin 15 when the lock is closed by its key 18.

Passages at least an inch wide are arranged in the belt 7 in a longitudinal row. One passage 19 is laterally open, but the belt has an annular wall 20 in each of the other passages 21.

The aforedescribed locking attachment is applied as follows:

The two straps 8, 9 are passed upward on either side of a spoke 6 of the wheel 3 until the spoke is received in the loop 22 formed by the straps and a portion of the belt 7. The pin 15 is passed sequentially through the openings 14 of the straps, as shown in FIG. 2, so as temporarily to secure the attachment to the wheel 3. The belt 7 is then bent into an approximately circular loop to find the passage 21 which is diametrically opposite the laterally open passage 19, and the lever 4 is slipped through the opposite passage 21. The arm 5 is next moved through the open side into the passage 19. The hinge barrel 12 is inserted between the barrels 11, 13, and the pin 15 is pushed through the aligned barrels and locked in place by the key 18.

Even if the belt 7 fits loosely about the top end of the column 1, the wheel 3 cannot be turned through an angle adequate for driving the car without breaking the gear shift lever 4 or destroying the belt 7. The heavy metal mesh of the latter readily resists the tools of the casual car thieves who account for the great majority of all car thefts. The locking attachment cannot resist the tools of the professional burglar for more than a few minutes, but even steering column locks are not entirely safe against the true professional.

If the car is again to be used by its rightful owner, the pin 15 is released from the hinge barrel 11 by the key 18, and the attachment is removed from the steering wheel 3 by performing the aforedescribed operations in reversed sequence.

In a car equipped with a floor mounted gear shifting lever but having a column-mounted directional light switch arm of the type described, a single passage through the belt 7 is sufficient, and the laterally open passage 19 is unnecessary. The attachment is not useful for the few motorcars whose steering column is not provided with a radially projecting control member near the top of the steering column.

If the wheel 3 has at least two spokes, it is sufficient to provide a single strap 8. This arrangement will permit the wheel to be turned through an angle of approximately 180°, but this is not sufficient for operating a motorcar having the usual steering ratio. Two straps are preferred in steering wheels having but one spoke.

A belt 7 having a row of passages 21 can be used on steering columns having a gear shifting lever 4 and a directional light switch arm 5 which are not diametrically opposed in the manner illustrated in FIG. 1. If the attachment is specifically intended for a single type of wheel arrangement, the number of passages through the belt 7 may be reduced to the number of control members which radially project from the top of the steering column.

Because a loose fit of the belt 7 on the column 1 is not detrimental, belts of one size or of very few sizes can fit practically every car. If a single locking arrangement is desired to fit an unusually wide variety of steering column arrangements, removable connecting members having two hinge barrels at one end and one hinge barrel at the other end may be interposed between the ends of the belt 7 to increase the effective length of the belt, a lock being provided in one of the paired barrels in a manner obvious from the description of the illustrated embodiment.

Obviously, other modifications and variations of the present invention are possible in the light of the above teachings. It is therefore to be understood that, within the scope of the appended claims, the invention may be practiced otherwise than as specifically described.

What is claimed is:

1. A locking attachment for the steering wheel of a motor car comprising, in combination:
   (a) a flexible belt member having two ends spaced apart in a predetermined direction, a passage extending through the belt intermediate the ends thereof, said belt member having an annular wall in said passage;
   (b) a strap having one end fixedly fastened to said belt member and a free end spaced from said one end transversely of said direction; and
   (c) locking means releasably locking said two ends to each other and releasably locking said free end to said belt member in the operative condition of said locking attachment.

2. An attachment as set forth in claim 1, wherein said belt member is elongated and formed with a second passage therethrough, said passages being longitudinally spaced and said second passage being laterally open.

3. An attachment as set forth in claim 1, wherein said locking means include a lock member and a key member releasably insertable in said lock member for opening and closing the same.

4. An attachment as set forth in claim 1, further comprising a second strap having one end fixedly fastened to said belt member and a free end, said locking means releasably locking the free end of said second strap to said belt member in said operative position.

5. An attachment as set forth in claim 4, wherein said belt member is elongated, and said fixedly fastened ends of said straps are spaced longitudinally of said belt member, the spacing of said fixedly fastened ends being but a small fraction of the length of said belt member.

6. An attachment as set forth in claim 1, wherein said passage has a width of at least one inch.

7. In a motor car, in combination:
   (a) a steering column having an axis and an axial top end;
   (b) a steering wheel having a rim and at least one spoke, said spoke radially connecting said rim to said top end;
   (c) an elongated control member having one end fastened to said top end and radially projecting from the same;
   (d) a flexible, elongated belt member formed with a passage therethrough receiving said control member;
   (e) a strap having one end fixedly to said belt member and another free end spaced from said one end transversely of the direction of elongation of said belt member; and
   (f) locking means releasably locking the two longitudinal ends of said belt member to each other so that the belt member extends in a closed loop about said top end, and releasably locking said free end to said belt member, said strap and said belt member defining a loop receiving said spoke.

References Cited

FOREIGN PATENTS 523,587  7/1940  Great Britain.

RICHARD E. MOORE, Primary Examiner.
ROBERT L. WOLFE, Assistant Examiner.